United States Patent [19]

Knudsen et al.

[11] 3,951,076

[45] Apr. 20, 1976

[54] TROLLEY CONSTRUCTION

[75] Inventors: Kenneth F. Knudsen, St. Clair Shores; George O. Nienhold, Kentwood, both of Mich.

[73] Assignee: American Chain & Cable Company, Inc., Bridgeport, Conn.

[22] Filed: Sept. 20, 1974

[21] Appl. No.: 507,852

[52] U.S. Cl. .................................. 105/155; 104/95
[51] Int. Cl.² .................................................. B61B 3/00
[58] Field of Search ............. 105/148, 155; 107/95, 107/107, 172 S, 94; 301/1, 5.3, 5.7, 114; 308/189 R, 191, 187.1; 16/98, 46, 47; 85/50 R

[56] References Cited
UNITED STATES PATENTS

| | | | |
|---|---|---|---|
| 1,015,124 | 1/1912 | Beck | 301/114 |
| 2,434,501 | 1/1948 | Lonze | 301/5.7 |
| 3,033,128 | 5/1962 | Czarnecki | 105/155 |
| 3,556,570 | 1/1971 | Cosenza | 85/50 X |
| 3,602,150 | 8/1971 | Frost et al. | 105/155 X |

*Primary Examiner*—John J. Love
*Attorney, Agent, or Firm*—Barnes, Kisselle, Raisch & Choate

[57] ABSTRACT

A trolley comprising a trolley body, a shaft fixed on the trolley body and having ends projecting outwardly along the sides of the trolley body and a wheel on each end of the shaft. Each wheel comprises an inner race, an outer race and rollers between the inner and outer races. The inner race having an opening through which the end of the shaft extends. The inner race also has a frusto conical surface adjacent the end of the opening. A conical washer having its outer surface complementary to the frusto conical surface of the inner race is placed adjacent thereto and interengaging means are provided between the washer and the shaft end to prevent rotation therebetween. Each end of the shaft having a threaded opening extending axially therein and a cap screw is threaded into the opening and engages the conical washer to hold the washer against the inner race and relative to the end of the shaft.

18 Claims, 5 Drawing Figures

TROLLEY CONSTRUCTION

This invention relates to conveyors and particularly to conveyors utilizing trolleys.

BACKGROUND OF THE INVENTION

In conveyor systems such as power and free conveyor systems, trolleys are utilized to support the load for movement along the track. Conventionally, the trolleys include wheels rotatably mounted on a trolley body and engaging the track. In one commonly used type of construction, the wheels are mounted on the trolley body by swaging the ends of a shaft against the inner race of the wheels. The problem with such a construction is that in case of failure of the bearing or damage to the wheel, it is necessary to remove the trolley from the conveyor system for repair.

It has heretofore been suggested that the wheels might be removably mounted on the shaft. One type of construction that has been suggested has been to provide key and slot connections between the shaft and the trolley body and between the inner race and the trolley body and to utilize threaded plugs which are threaded into the ends of the shaft and engage the inner race. The problem with such a construction is that it requires substantial modification of the trolley body and the shaft and in addition there is a tendency for the threaded plug to become loose in use.

Accordingly among the objects of the invention are to provide a trolley construction wherein the wheels are removably mounted; wherein although the wheels are removably mounted, they are effectively locked against loosening; wherein changes can be made in the field while the trolley is in position on the track; wherein the conventional swaged construction can be modified without substantial reconstruction or machining of the trolley body.

SUMMARY

In accordance with the invention a shaft is fixed on said trolley body and has ends projecting outwardly along the sides of the trolley body. A wheel is provided on each end of the shaft and comprises an inner race, an outer race and rollers between the inner and outer races. The inner race having an opening through which the end of the shaft extends. The inner race preferably has a frusto conical surface adjacent the end of the opening and a conical washer having its outer surface complementary to the frusto conical surface of the inner race is positioned adjacent the inner race. Interengaging means are provided between the washer and the shaft to prevent rotation therebetween. Finally, each end of the shaft has a threaded opening extending axially therein and a cap screw is threaded into the opening and engages the conical washer to hold said washer against said inner race and relative to the end of the shaft. Means are provided for locking the cap screw against rotation.

DESCRIPTION

Figure 1:
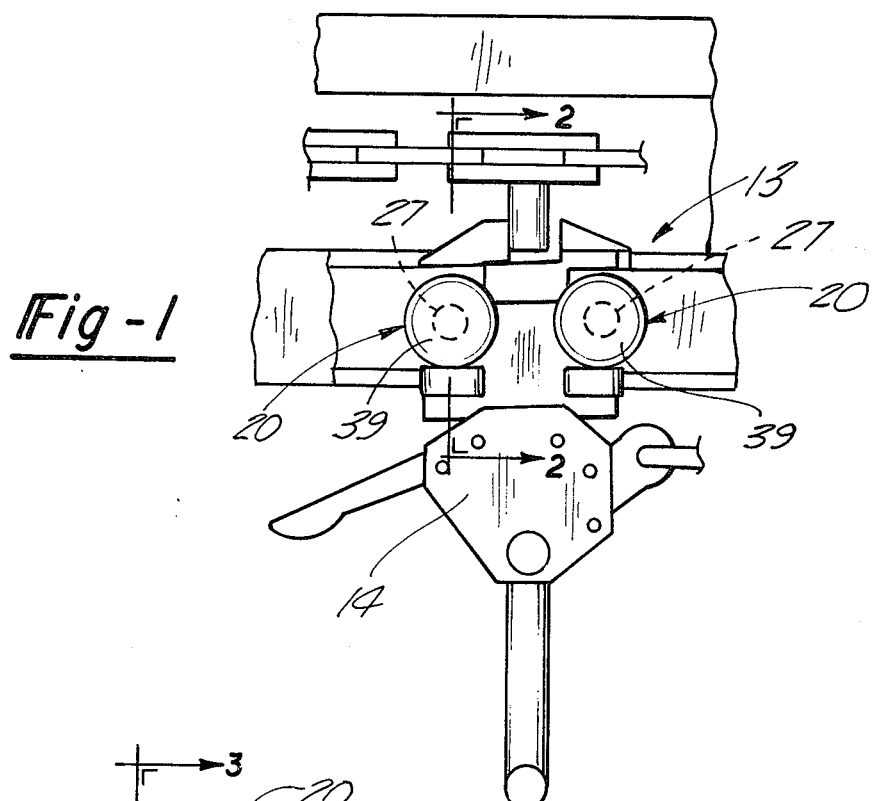
FIG. 1 is a side elevational view of a trolley embodying the invention.
Figure 2:
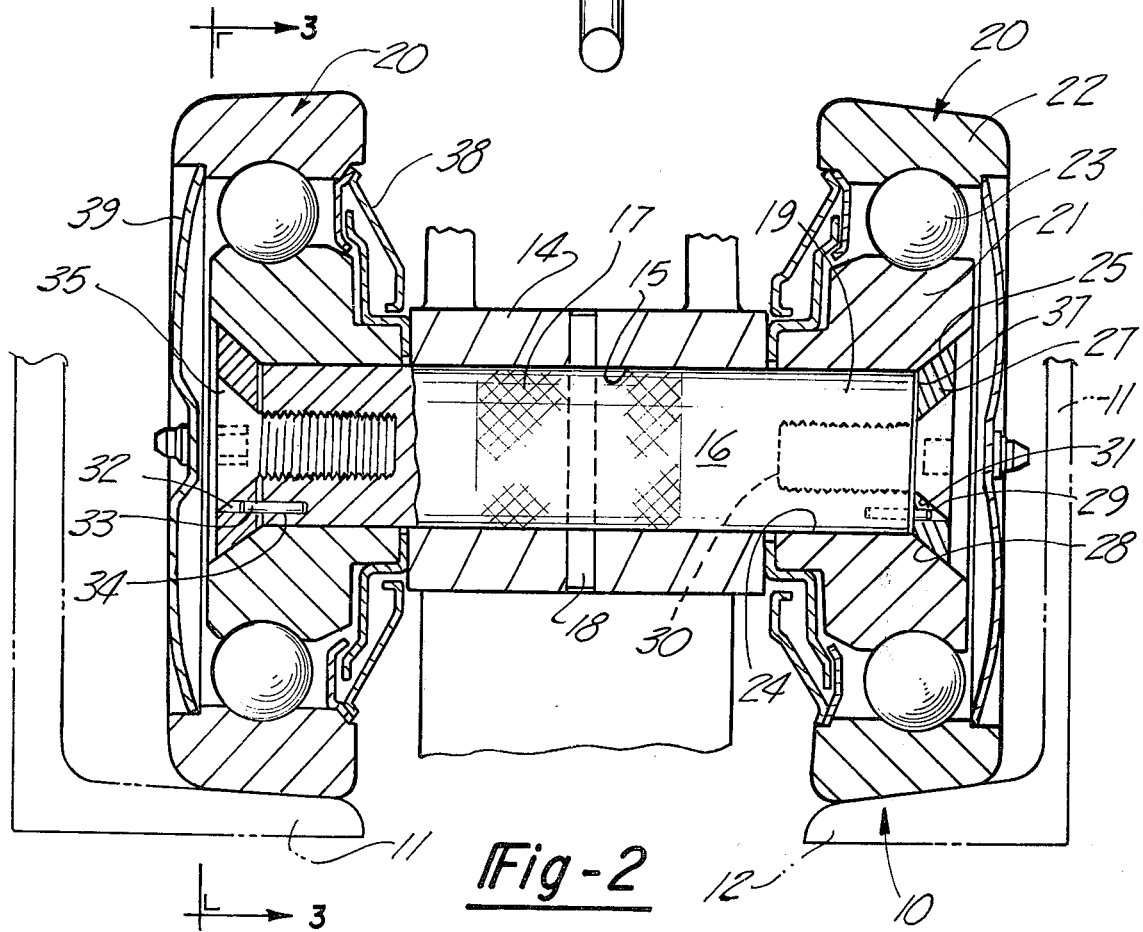
FIG. 2 is a sectional view on an enlarged scale taken along the line 2—2 in FIG. 1.
Figure 3:
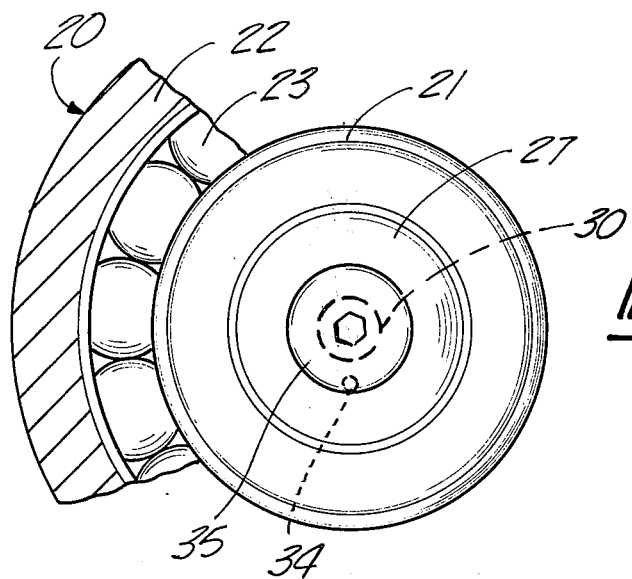
FIG. 3 is a fragmentary side elevational view of a part of the trolley taken along the line 3—3 in FIG. 2, parts being broken away.

Referring to FIGS. 1 and 2, the trolley construction embodying the invention is adapted for use with conveyors such as power free and free conveyors wherein the load supporting trolleys are movable along a track 10 which comprises inwardly extending channels 11 having lower webs 12 on which the wheels of the trolley move.

Each trolley 13 comprises a trolley body 14 having an opening 15 through which a shaft 16 extends transversely. The center 17 of the shaft is knurled and a press fitted pin 18 extends transversely of the shaft and through the body to lock the shaft in position with respect to the body.

The ends 19 of the shaft extend outwardly beyond the sides of the body and a wheel 20 is mounted on the ends 19. Each wheel 20 is of conventional construction and comprises an inner race 21 which may be a one or two piece race, an outer race 22 and bearing means such as balls 23 between the inner and outer races. The inner race 21 formed with an opening 24 through which the end 19 of the shaft extends. The inner race is further formed with a frustro conical surface 25, the inner edge 26 of which terminates slightly beyond the outermost portion of the end 19 of the shaft. A frusto conical washer 27 is provided and includes a frusto conical surface 28 complementary to the surface 25 and an inner frusto conical surface 29. A cap screw 30 is threaded into an axial threaded opening 31 in each end 19 of the shaft and has a frusto conical surface 31 complementary to the surface 29 of the washer 27. Each washer 27 further includes an opening 32 for receiving a dowel pin 33 that also extends into an opening 34 in the shaft thereby locking the washer 27 in position with respect to the end of the shaft 16.

As can be seen in the drawings, the outer surface 35 of cap screw 30 is flat and the dimensions are such that the outer surface of the screw and the outer surface 36 of the washer are flush. The dimensions are selected such that the inner surface 37 of the washer 27 is spaced from the outermost portion of the end 19 of the shaft when the wheel is locked into position. Cap screw has a socket thereon for receiving an Allen head wrench.

The wheel further includes inner and outer shields 38, 39 for sealing the wheel and a fitment 40a for supplying lubricant to the interior of the wheel.

Alternately, the trolley can be made without shields.

Figure 4:
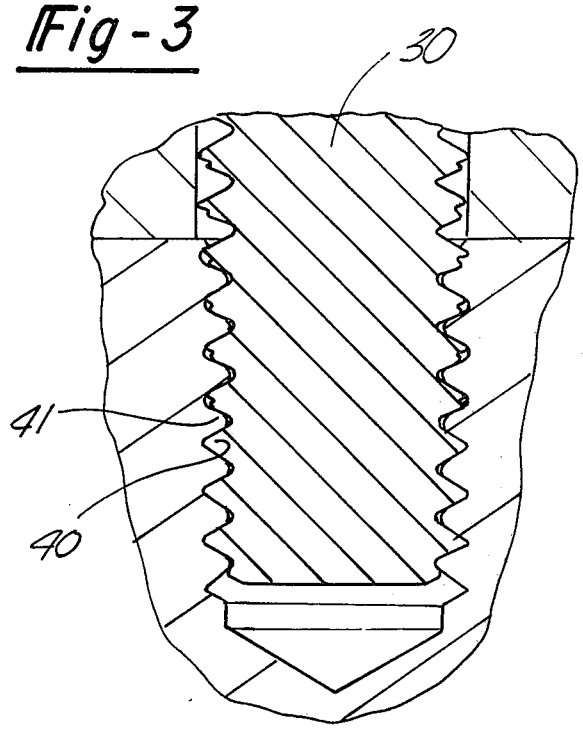
FIG. 4 is a fragmentary longitudinal sectional view through a cap screw used in the invention.

Means are provided for locking screw 30 against rotation due to vibration and the like. Thus, as shown in FIG. 4, screw 30 has threads 40 shaped to lock against the threads 41 in shaft 19. Such a thread form for screw 30 is sold by Holo-Krome Company, West Hartford, Conn. Other means for locking screw 30 can also be used. For example, a plastic insert may be provided in the screw which engages the threads on the shaft to retard rotation of the screw.

Figure 5:
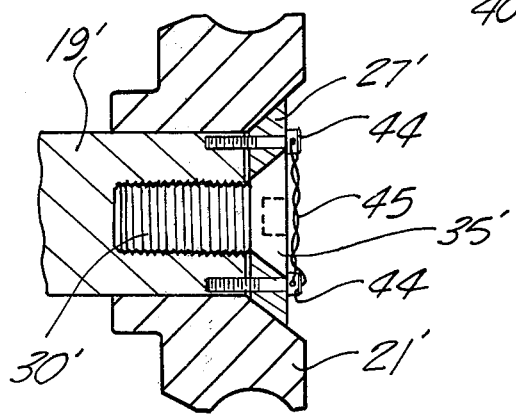
FIG. 5 is a fragmentary sectional view of a modified form of the trolley.

In the form shown in FIG. 5, the washer 27' is interengaged with the shaft 19' by screws 44 threaded into the shaft 19'. The screws 44 are locked to one another by wires 45 extending through openings therein and twisted together.

It can thus be seen that there has been provided a construction for trolleys wherein the wheels are readily removable; wherein in practice the wheel is locked so that it will not loosen; wherein no changes are needed to the trolley body; and wherein replacement of wheels can be made in the field without removing the trolley from the system.

By locking the conical washer against rotation with respect to the shaft, no turning torque is produced on the cap screw which would tend to loosen the cap screw.

We claim:

1. In a trolley, the combination comprising
   a trolley body;
   a shaft fixed on said trolley body and having ends projecting outwardly along the sides of the trolley body,
   a wheel on each end of the shaft,
   each wheel comprising an inner race, an outer race and bearing means between the inner and outer races,
   said inner face having an opening through which the end of the shaft extends,
   said inner race having a frusto conical surface adjacent the end of the opening,
   a conical washer,
   said washer having its outer surface complementary to the frusto conical surface of the inner race,
   interengaging means between the washer and the shaft end preventing rotation therebetween,
   each end of the shaft having a threaded opening extending axially therein,
   and a cap screw threaded into said opening and engaging said conical washer to hold said washer against said inner race.

2. The combination set forth in claim 1 wherein said interengaging means between said conical washer and said shaft comprises a dowel pin, said washer and said shaft having axially extending openings into which said dowel pin extends.

3. The combination set forth in claim 1 wherein said cap screw and said washer have complementary conical surfaces.

4. The combination set forth in claim 3 wherein the end of said cap screw is flat.

5. The combination set forth in claim 1 wherein the cap screw and washer are so constructed and arranged that the flat end of the cap screw is flush with respect to the axial outer end of the washer.

6. The combination set forth in claim 1 including interlocking means between the cap screw and the shaft.

7. The combination set forth in claim 6 wherein said interlocking means comprises interfering threads.

8. The combination set forth in claim 1 wherein said interengaging means between said washer and said shaft comprises screws extending through said washer into said shaft.

9. The combination set forth in claim 8 including means for locking said screws to prevent rotation thereof.

10. In a trolley, the combination comprising
    a trolley body,
    a shaft fixed on said trolley body and having ends projecting outwardly along the sides of the trolley body,
    a wheel on each end of the shaft,
    each wheel comprising an inner race, an outer race, and bearing means between the inner and outer races,
    said inner race having an opening through which the end of the shaft extends,
    said inner race having a frusto conical surface adjacent the end of the opening,
    a conical washer,
    said washer having its outer surface complementary to the frusto conical surface of the inner race,
    interengaging means between the washer and the shaft end preventing rotation therebetween,
    each end of the shaft having a threaded opening extending axially therein,
    and a cap screw threaded into said opening and engaging said conical washer to hold said washer against said inner race,
    said cap screw and said washer having complementary conical surfaces,
    the end of said cap screw being flat,
    said cap screw and washer being so constructed and arranged that the flat end of the cap screw is flush with respect to the axial outer end of the washer and recessed with respect to the inner race.

11. The combination set forth in claim 10 wherein said interengaging means between said conical washer and said shaft comprises a dowel pin, said washer and said shaft having axially extending openings into which said dowel pin extends.

12. The combination set forth in claim 10 including interlocking means between the cap screw and the shaft.

13. The combination set forth in claim 10 wherein said interengaging means between said washer and said shaft comprises screws extending through said washer into said shaft.

14. The combination set forth in claim 13 including means for locking said screws to prevent rotation thereof.

15. In a trolley, the combination comprising
    a trolley body,
    a shaft fixed on said trolley body and having ends projecting outwardly along the sides of the trolley body,
    a wheel on each end of the shaft,
    each wheel comprising an inner race, an outer race, and bearing means between the inner and outer races,
    said inner race having an opening through which the end of the shaft extends,
    said inner race having a frusto conical surface adjacent the end of the opening,
    a conical washer,
    said washer having its outer surface complementary to the frusto conical surface of the inner race,
    interengaging means between the washer and the shaft end preventing rotation therebetween,
    each end of the shaft having a threaded opening extending axially therein,
    and a cap screw threaded into said opening and engaging said conical washer to hold said washer against said inner race,
    said interengaging means between said washer and said shaft comprising screws extending through said washer into said shaft,
    and wires interconnecting said screws to prevent rotation thereof.

16. In a trolley, the combination comprising a trolley body, a shaft fixed on said trolley body and having ends projecting outwardly along the sides of the trolley body, a wheel on each end of the shaft, each wheel comprising an inner race, an outer race, and bearing means between the inner and outer races, said inner race having an opening through which the end of the shaft extends, said inner race having a frusto conical surface adjacent the end of the opening, a conical washer, said washer having its outer surface complementary to the frusto conical surface of the inner race, interengaging means between the washer and the shaft end preventing rotation therebetween, each end of the shaft having a threaded opening extending axially therein, and a cap screw threaded into said opening and engaging said conical washer to hold said washer against said inner race, said cap screw and said washer having complementary conical surfaces, the end of said cap screw being flat, said cap screw and washer being so constructed and arranged that the flat end of the cap screw is flush with respect to the axial outer end of the washer and recessed with respect to the inner race, said interengaging means between said washer and said shaft comprising screws extending through said washer into said shaft, and wires interconnecting said screws to prevent rotation thereof.

17. In a trolley, the combination comprising a trolley body, a shaft fixed on said trolley body and having ends projecting outwardly along the sides of the trolley body, a wheel on each end of the shaft, each wheel comprising an inner race, an outer race, and bearing means between the inner and outer races, said inner race having an opening through which the end of the shaft extends, said inner race having a frusto conical surface adjacent the end of the opening, a conical washer, said washer having its outer surface complementary to the frusto conical surface of the inner race, a dowel pin, said washer and said shaft having axially extending openings into which said dowel pin extends, each end of the shaft having a threaded opening extending axially therein, and a cap screw threaded into said opening and engaging said conical washer to hold said washer against said inner race, said cap screw and said washer having complementary conical surfaces, said washer having an inner surface spaced from the end of said shaft when the wheel is locked in position.

18. In a trolley, the combination comprising a trolley body, a shaft fixed on said trolley body and having ends projecting outwardly along the sides of the trolley body, a wheel on each end of the shaft, each wheel comprising an inner race, an outer race, and bearing means between the inner and outer races, said inner race having an opening through which the end of the shaft extends, said inner race having a frusto conical surface adjacent the end of the opening, a conical washer, said washer having its outer surface complementary to the frusto conical surface of the inner race, a dowel pin, said washer and said shaft having axially extending openings into which said dowel pin extends, each end of the shaft having a threaded opening extending axially therein, and a cap screw threaded into said opening and engaging said conical washer to hold said washer against said inner race, said cap screw and said washer having complementary conical surfaces, said washer having an inner surface spaced from the end of said shaft when the wheel is locked in position, the end of said cap screw being flat, said cap screw and washer being so constructed and arranged that the flat end of the cap screw is flush with respect to the axial outer end of the washer and recessed with respect to the inner race.

\* \* \* \* \*